United States Patent [19]

Molyneux

[11] 4,037,384
[45] July 26, 1977

[54] ANCHORAGE ASSEMBLIES

[76] Inventor: Godfrey Matthew Owen Molyneux, Burway, Rudford, Gloucestershire, England

[21] Appl. No.: 606,457

[22] Filed: Aug. 21, 1975

Related U.S. Application Data

[63] Continuation of Ser. No. 441,321, Feb. 11, 1974, abandoned.

[30] Foreign Application Priority Data

Feb. 10, 1973 United Kingdom ............... 6658/73
Feb. 17, 1973 United Kingdom ............... 7925/73

[51] Int. Cl.² .................... E04B 1/41; E01D 11/00
[52] U.S. Cl. ................................ 52/698; 52/743; 85/3 R; 61/45 B
[58] Field of Search ............... 52/698, 710, 711, 743; 85/3 R; 61/45 B

[56] References Cited

U.S. PATENT DOCUMENTS

| 2,933,969 | 4/1960 | Huyssen ............... 85/3 R |
| 3,192,822 | 7/1965 | Genter ................. 85/3 R |

FOREIGN PATENT DOCUMENTS

| 1,152,933 | 9/1957 | France ................. 61/45 B |
| 788,854 | 1/1958 | United Kingdom ........ 61/45 B |

*Primary Examiner*—James L. Ridgill, Jr.
*Attorney, Agent, or Firm*—Young & Thompson

[57] ABSTRACT

An anchorage assembly for securing structural members to a solid concrete base employs a bolt and washer arrangement. The concrete is formed or drilled with a blind hole and one end of the bolt, carrying the washer, is entered into it. The construction of the washer and its relationship to the size of the cavity, the bolt shank and head or nut on the bolt allows it to enter the hole, but when the bolt and nut are tightened to secure the structural member, the washer jams. The bolt can previously be adjusted within the hole so that its emergent parts is correctly positioned. Grouting can be carried out further to secure the assembly.

11 Claims, 16 Drawing Figures

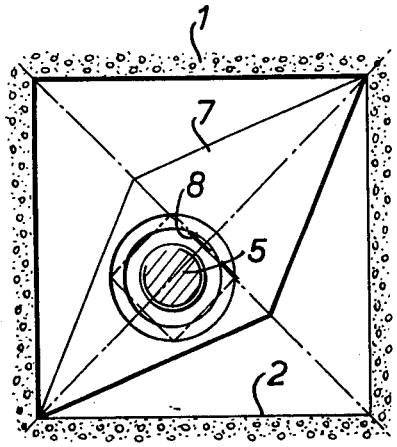
FIG. IA.
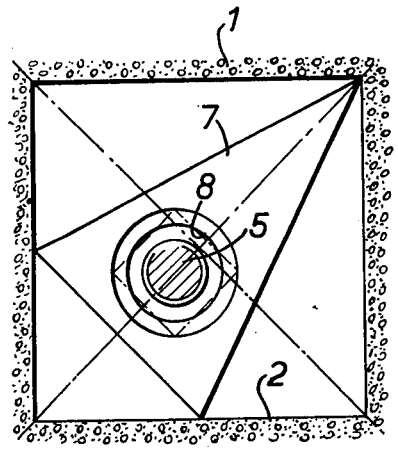
FIG. IB.
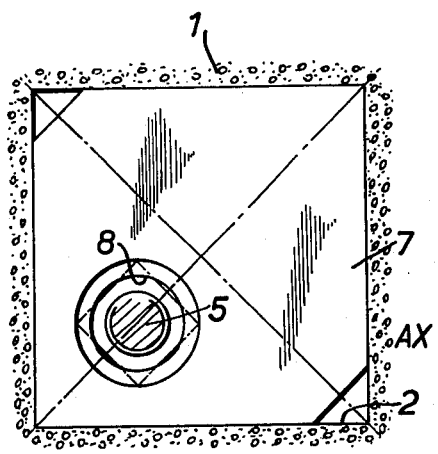
FIG. IC.
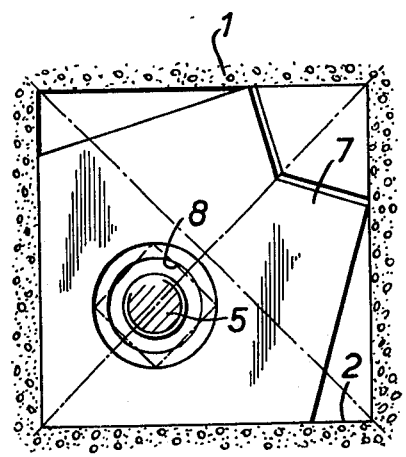
FIG. ID.

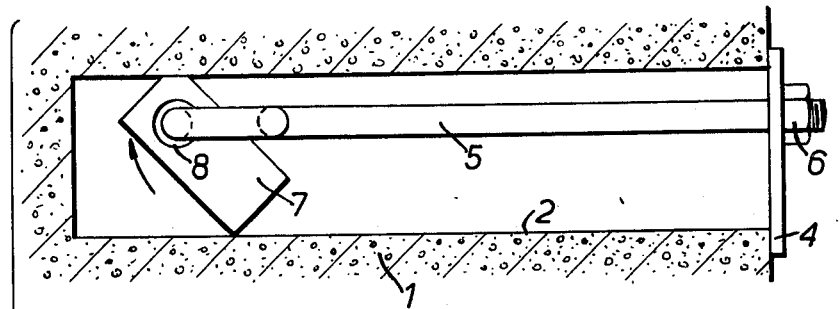
FIG. 7.
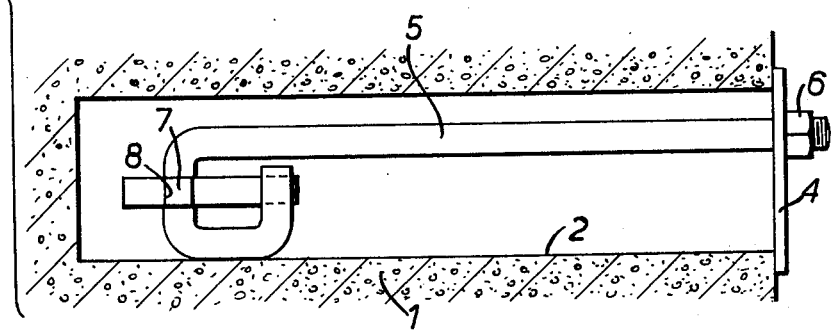
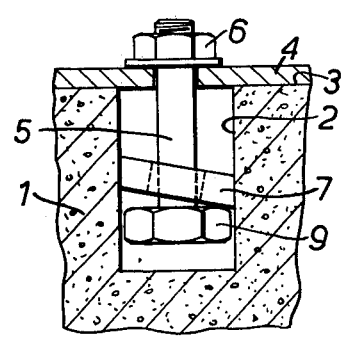
FIG. 8.
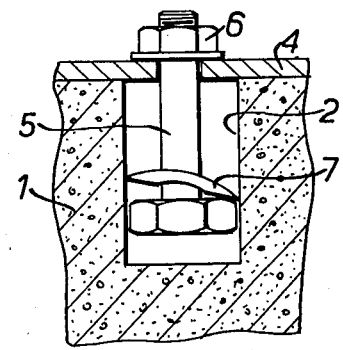
FIG. 9.
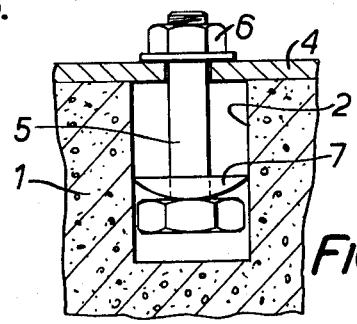
FIG. 10.

ANCHORAGE ASSEMBLIES

This is a continuation of application Ser. No. 441,321, filed Feb. 11, 1974, now abandoned.

This invention relates to anchorage assemblies and to methods of securing one member to another where the only securing means that one of the members offers is a cavity. It is particularly concerned with the anchoring of steel structural members to concrete bases, foundations, floors and the like.

The most usual way of fastening to a concrete block is to form a blind hole and to use an expansion bolt that grips against the sides of the hole. These devices require the hole to be extremely accurately located. For example, a steel structural member formed with base flanges bored with a number of holes for fastening bolts requires an equal number of accurately bored or mould-forming holes in the concrete, and this is extremely difficult to achieve.

Alternatively a cavity tapering downwards is provided in the concrete, with the wide neck providing movement for the bolt. This is done by casting the bolt and a retaining plate into the concrete and providing a mould for the tapering cavity around the bolt. The mould is removed leaving the retaining plate cast into the concrete preventing the bolt being withdrawn, but allowing it to move within the area of the neck of the cavity. This installation is troublesome to construct but allows a steel structural member to be fixed within the area of the neck of the hole. Therefore less accuracy in positioning is required. However, it is quite usual for the level of the installation to be incorrect resulting in insufficient thread on the bolt available for fixing to the structural member.

It is therefore an object of this invention to provide, in one aspect, an anchorage system where the cavity provided in the concrete need only be approximately located in order to fix a member to the concrete. An anchorage device of the invention is installed after the concrete forming the cavity has set, and it can therefore be ensured that sufficient bolt thread is available to attach the structural member, even though the original concrete levels were incorrect.

According to one aspect of the present invention there is provided an anchorage assembly comprising a nut and bolt, and a washer captive on the bolt shank and having at least two opposed peripheral points with an undistorted span between them greater than that of the bolt head or nut and being capable of assuming a position and/or shape other than flat and perpendicular to the shank, the bolt and washer being relatively movable axially of the bolt to cause co-operation of the bolthead or nut with the washer thereby to tilt or distort the washer, when in such other position and/or shape, to increase said span as projected onto a plane perpendicular to the shank.

The bolt may be a headed one with the washer lying generally transverse to the shank. Alternatively, it may be a hook bolt with the washer on the part of the hook that extends transversely from the shank.

According to another aspect of the present invention there is provided a method of securing a first member to a second member, the first member having an aperture and the second a cavity enterable by said washer in a tilted or distorted condition, wherein an anchorage assembly as defined above or described below is arranged with the bolthead and washer within the cavity and the thread of the bolt projecting therefrom, the first member is ordered up to the second member so that the thread is inserted through said aperture and a nut is tightened onto the thread projecting through the aperture thereby to try to pull the bolt, whose head causes the washer to tilt or distort to jam against the sides of the cavity.

According to a further aspect of the present invention there is provided a method of securing a first member to a second member, the first member having an aperture and the second a cavity enterable by said washer in a tilted or distorted condition, wherein an anchorage assembly as defined above or described below is arranged with the bolt inserted through said aperture and with a nut thereon, the washer being captive on the bolt shank on the side of said first member towards the second member, wherein the first member is offered up to the second member so that the length of shank with the washer thereon enters the cavity, and wherein the nut-bolt assembly is tightened to cause the washer to be tilted and jam against the sides of the cavity.

After the nuts and bolts have been tightened, in either of these methods the cavity may be grouted, with cement or epoxy resin for example.

The cavity may be a variety of shapes, but in general square or circular section ones will be used. The cavity bottom is also shaped so that the mechanism can function correctly. The washer will have at least one transverse dimension greater than a span of the cavity, so that it can contact opposite sides, at a tilted angle, with at least two points, one of which will be further into the cavity than the other. This will give a secure jamming action, to be described with various embodiments below.

The invention may be performed in various ways and some constructional forms will now be described, by way of example, with reference to the accompanying drawings, in which:

FIGS. 1A-1D show diagrammatic plan views of anchorage assemblies for securing members to a concrete base with square section cavities, FIG. 2A-2D show diagrammatic plan views of anchorage assemblies for securing members to a concrete base with circular section cavities, FIGS. 3 and 4 are diagrammatic side elevations showing the jamming action of the anchorage assemblies of FIGS. 1 and 2, FIG. 5 is a perspective view of another anchorage assembly, FIG. 6 is a plan view of further anchorage assemblies for a rectangular or square section cavity, FIG. 7 shows side views of yet another anchorage assembly, and FIGS. 8 to 10 are diagrammatic side elevations of further anchorage assemblies for securing a member to a concrete base with exactly located cavities.

In all the Figures, it will be assumed that a concrete base or surround 1 has a blind hole or cavity 2 extending downwards or into the concrete from a face 3 to which a plate 4 is to be secured. The plate is positioned in the exact desired spot without careful reference being made to the cavity 2, which in FIGS. 1 to 7 need only be approximately in the correct position. However, it does allow a bolt 5 to be accommodated therein and to extend up through a hole in the plate 4 to be secured by a nut 6. The head of the bolt is near the bottom of the cavity 2 and a retaining washer 7 rests thereon. This washer may take many different forms as will be described. In each of FIGS. 1 to 6 it has a circular countersunk aperture 8 eccentric with respect to the periphery of the washer and larger than the shank of the bolt, but less than the span of the head. The outer periphery of each asher is so dimensioned and shaped and the aperture 8 is sufficiently tolerant to allow the washer to be tilted sufficiently far on the bolt shank for the washer readily to enter the cavity 2, although it cannot so enter if generally normal to the axis of the cavity. The bolt 5 has the facility for being tilted once the washer is in place, so that the threaded part which emerges from the cavity can be accurately positioned to register with the hole in the plate 4. The amount of emergent thread is simply determined by how far down in the cavity the washer is set. The bolt, nut and washer constitute an anchorage assembly in the following various ways.

FIG. 1 shows four different anchorage assemblies, each one designated for fitting into a square section blind hole or cavity 2 formed in the concrete base structure 1. The washer 7 of FIG. 1A is in the form of a rhombus, with the aperture offset from the center along the major axis. The more pointed ends dig into opposite corners of the hole, and the one nearer the washer aperture is set lower down in the hole so that as the nut is tightened on the bolt the head tends to draw that corner upwards to dig harder into the corner. The washer pivots on the opposite corner, which is pressed further into that corner of the hole as the washer tries to move more normal to the hole axis. This jamming action will be further explained later, in connection with FIGS. 3 and 4.

FIG. 1B shows a washer 7 of isosceles triangular form, with the aperture 8 centered on the axis of symmetry and near the base. The base is set lower down in the hole, and the higher apex digs into one corner. The two base corners dig into sides adjacent the opposite corner. Again, as the nut is tightened the bolt head tends to pivot the washer to draw the base upwards and press the apex into the corner, so jamming the assembly.

FIG. 1C shows a hexagonal washer 7, where two opposite sides are very short. The four other ones are the same length and each adjacent pair subtend between them an angle slightly less than 90° C. The washer is symmetrical about the common bisector of these two angles and the aperture is offset towards one of them, which is set lower down in the hole. As viewed in plan the tilted washer appears square. The jamming action is somewhat similar to that described above, but with line contact with the sides of the hole, as well as corner engagement.

FIG. 1D shows another hexagonal washer 7, again with an axis of symmetry but with a re-entrant formed by two of the sides. These form sharp corners which are set relatively high within the hole to dig into the sides, while the corner opposite the re-entrant is set low, with its adjacent sides having linear engagement with the adjacent sides of the hole, in the manner of FIG. 1C. The washer aperture 8 is offset towards this corner.

Figure 2A:
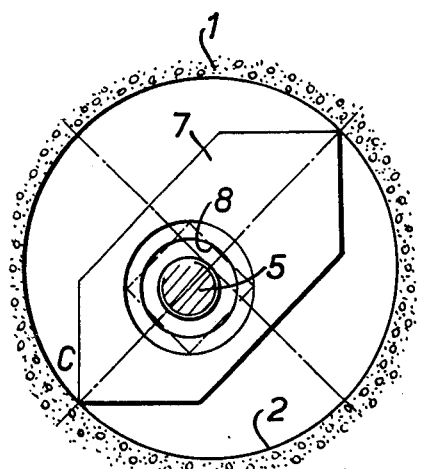
FIG. 2A shows a hexagonal washer which engages opposite sides of the hole at the ends of an inclined diagonal. The washer is symmetrical about this line and the aperture is towards the lower end.
Figure 2B:
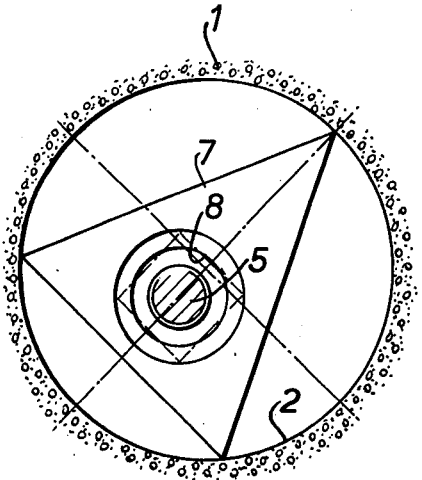
FIG. 2B is equivalent to FIG. 1B, with an isosceles triangular washer.
Figure 2C:
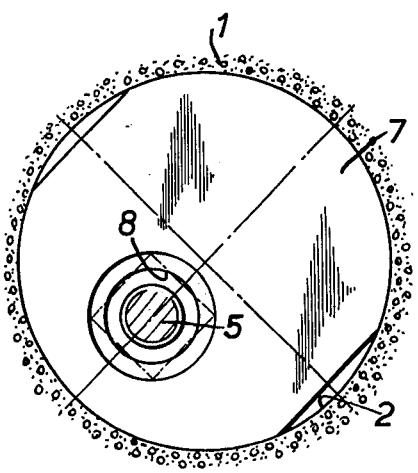
FIG. 2 shows arrangements for a circular section hole 2 in the concrete.

FIG. 2C has a generally elliptical washer with the aperture offset along the major axis. Flats are formed at the ends of the minor axis. As viewed in plan the tilted washer appears generally circular, with the elliptical portions having linear engagement with the sides of the hole.

Figure 2D:
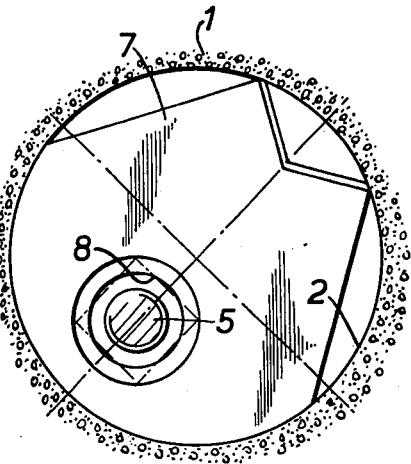

FIG. 2D is equivalent in part to FIG. 2C and in part to FIG. 1D. There is a low set elliptical edge which has linear engagement with the cylindrical surface of the hole, and towards which the aperture is offset, and straight edges forming a re-entrant and sharp corners for digging into the hole wall.

Figure 3:
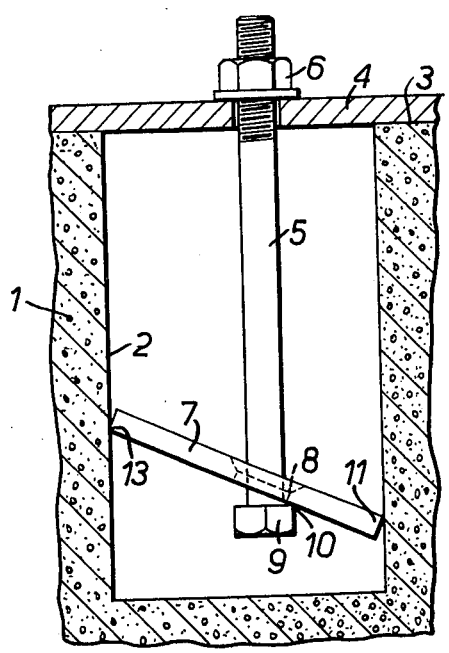
Figure 4:
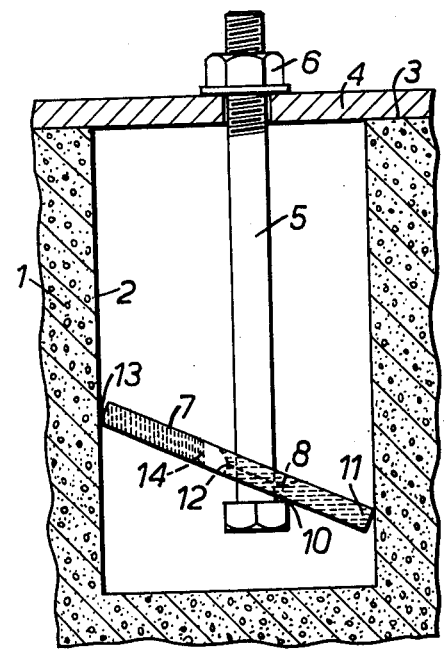

FIG. 3 illustrates how the bolt jams the washers which have pointed engagement with the sides of the cavity, be it circular or square, and FIG. 4 illustrates the linear engagement. The head 9 of the bolt 5 will act on the underside of the washer 7 at a point 10 between the aperture and the lowermost point 11 of the washer. As the nut 6 is tightened against the plate 4 (with the intermediary of an "ordinary" washer in most cases, as shown) the head 9 will force the lower portion of the washer up against the wall of the cavity, either to increase the point contact pressure at 11 in FIG. 3 or the linear contact pressure over shaded lengths 11-12 and 13-14 in FIG. 4 or points along those lines. The engagement point 10 of the bolt head and washer in positioned in relation to the lowermost point in contact with the cavity for the uppermost point or points 13 not to be dislodged as the nut is tightened. In other words, the friction of the concrete wall is such that the washer will always tend to pivot about point or points 13 rather than allow the latter to slide up. As soon as the slightest pivoting takes place the washer becomes more securely jammed and dislodgement even less likely. This applies whether there is just the point contact as in FIG. 3, or whether there is line contact from 11 to 12 and 13 to 14 or points on those lines, as in FIG. 4.

Figure 5:
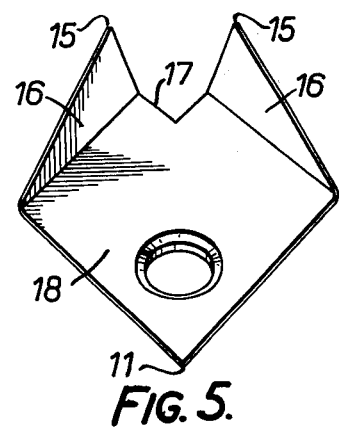

FIG. 5 shows a more complex washer 7 which is of rugged construction. It is a two-point-pivoting and two-side-contacting element on basically the same principle as FIG. 1D. However the contact points are the apices 15 of two triangular flanges 16 upstanding from the two edges of the polygonal plate adjacent the lowermost hole-contacting edges. A small re-entrant 17 is formed between those flanged edges opposite lowermost point 11. The flanges 16 incline outwards slightly from the plane of the apertured plate 18 forming the main body of the washer, so that there is point contact by apices 15 and not linear contact by the bases of the flanges with the cavity walls. The plate 18 can be set substantially horizontal, for there is still a steep incline from the lowermost point to the apices or pivoting points 15. The head of the bolt will herefore seat better against the underside. The re-entrant 17 provides a finger or mechanical hook hold for retrieving and adjusting the height of the washer within the cavity, and also leaves a space for the penetration of grout to the bottom of the cavity when assembly is complete. It will be noted that all the other washers described provide these properties.

Figure 6:
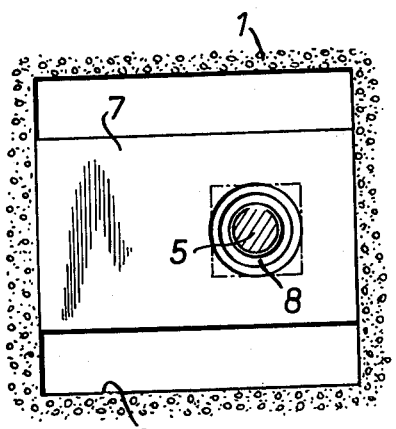

FIG. 6 shows a rectangular washer 7 which is suitable for a square or rectangular section cavity. The aperture 8 is eccentric along the major axis of symmetry, and there is line contact with opposite sides of the hole by the two shorter edges. The washer need not, and preferably does not, span the hole in the other direction, parallel to the minor axis.

FIG. 7 shows an ancorage assembly where the bolt 5 is a hook bolt, and the washer 7, instead of being generally transverse to the shank, is transverse to the part of the hook that extends laterally from the end of the shank. The washer 7 is generally rectangular and the aperture 8 is eccentric along the major axis. As the bolt is drawn from the cavity two opposite corners dig into the walls and jam against them. The arrow illustrates the direction in which the washer attempts to turn and the lowermost corner is formed with a flat.

It will be appreciated that the bolts in the above examples cannot be placed anywhere in the cavities, but there is sufficient freedom of movement for the threaded ends to be positioned as desired.

Similar principles can be applied to the securing of a structural member to a concrete base where the cavity in the concrete is in the exactly correct position, for example by being drilled through a hole in the structural member accurately located in its desired position. Here the washer is shown centrally mounted and the bolt head is able to provide a force in relation to the point, points, line or lines of highest contact of washer to cavity wall to cause the washer to tilt and jam. The washer must have one dimension greater than the diameter of the cavity in the concrete in order to jam with this tilting action. As the bolt head span is greater than the washer aperture it can tilt the washer, as with the previously described embodiments, to jam the washer against the sides of the cavity. The latter need only be drilled out to a diameter giving minimum tolerance to the bolt head. It may be necessary first to drill a pilot hole through the structural member into the concrete and then expand that pilot hole with the structural member temporarily removed.

An example of this form of anchorage assembly is shown in FIG. 8. The bolt head 9 fits closely within the cavity formed as described above and the threaded end of the bolt projects upwardly through the structural member 4 which is accurately located on the concrete surface 3. The washer 7 has a central hole of larger diameter than the shank of the bolt and the peripheries of its plane faces are elliptical, with the curved surface cylindrical to match the bore of the cavity. It is as if the washer were formed from an inclined slice taken from a cylindrical block with a diameter substantially equal to that of the cavity. The sharpest bevels at the outer periphery of the washer are at the elliptical vertices and these dig into the walls of the cavity when the bolt head is forced upwardly by the nut being tightened.

The washer of FIG. 8 is a thick element, possibly a casting. In FIG. 9 there is shown an alternative version where the washer 7 is formed from thinner, sheet material and bent so that it is curved transversely to the major axis. This bending lends rigidity to the washer, which will dig into the walls of the cavity as before. In FIG. 9 it is concave upwards, but such washers may be arranged concave downwards. In addition to the vertices engaging the cavity wall, with the concave upwards arrangement, the washer may be flattened slightly by the pressure of the bolt head and therefore engage the cavity substantially all round its periphery.

Another alternative is shown in FIG. 10 where use is made of a fully dished washer 7. This need not be loosely mounted on the shank of the bolt 5, but it must be convex towards the head. In its relaxed state the outer diameter is slightly greater than the diameter of the cavity, but by use of the a cylindrical punch (not shown) embracing the shank of the bolt it can be forced down into the cavity when the bolt is drawn up, the washer will tend to flatten and spread and thus dig further into the walls of the cavity and jam.

The use of a punch or at least a cylindrical guide member may be required for the washers of other embodiments. The working end of the guide would be inclined to correspond to sufficient tilt to allow the washer to enter the cavity.

Where the cavity bore is larger than the bolt head the installation will allow the bolt to be tilted, as indicated in the previous examples.

In each case, as or after the nut is tightened the cavity may be grouted, with cement or with quick setting epoxy resin, for example, after which no further movement is possible, if the installation was of the type where the bolt could be tilted in the setting-up process.

The anchorage assemblies designed for approximately located cavities lend themselves to a particularly convenient method of assembly. The normal practice is to lower a structural member onto bolts projecting from the concrete. If they are loose they all have to be individually placed in the holes in the structural member as it is lowered, which is time consuming and can be hazardous. If they are fixed it can occur that, even if they are accurately located, they do not project enough for efficient threading of the nut. This may be due to unevenness in the concrete surface or simply erroneous placing before the concrete was poured. A lengthening thread then has to be welded on. Also, the structural member can damage the threads as it hangs over the placement area and is lowered onto the concrete. With the loose washer assemblies described, they can be pre-attached to the structural member, and hang loosely therefrom. It is then lowered into position and the bolt heads and washers freely enter the cavities, being tilted and turned as necessary. When the structural member is seated, the nuts are tightened.

With this method the bolts may be reversed, so that it is the nuts that support the washers. With just bolt heads exposed, a neater finish is obtained.

Although all the washers described have at least one axis of symmetry, it will be understood that this need not necessarily be the case, and irregularly shaped washers may be employed.

I claim:

1. An assembly comprising a base having a blind hole therein, a structural member having an aperture registering with said hole, a bolt having enlargements adjacent opposite ends thereof, one of said enlargements being a nut screw-threadedly received on the bolt, the bolt extending through said aperture, one of said enlargements being in said blind hole and the other of said enlargements being on the side of said structural member opposite said hole, and a single washer element on the bolt within the hole and jammed without significant penetrations against the sides of the hole when the bolt and the nut are mutually tightened, said washer element having at least two peripheral points with an undistorted span greater than at least one transverse dimension of the hole, the bolt being held captive to the washer solely by said enlargement within the hole, and the washer providing an aperture enabling the bolt to tilt but not to move substantially laterally relative to the washer, thereby ensuring that said enlargement within the hole exerts a force eccentric with respect to said two points and enabling the bolt to be adjusted angularly within the hole to emerge from the hole at a selected position before the nut and bolt are mutually tightened.

2. An assembly according to claim 1, wherein the washer aperture is eccentric with respect to said two points.

3. An assembly as claimed in claim 1, wherein the force applied to the washer is eccentric to the center of gravity of the washer.

4. An assembly as claimed in claim 1, wherein the washer aperture is countersunk at at least one face of the washer.

5. An assembly as claimed in claim 1, wherein said peripheral points are on portions of the washer that are neither parallel to nor coplanar with each other.

6. An assembly as claimed in claim 1, said washer element, when viewed along the axis of the bolt, extending outwardly on all sides beyond the enlargement which is in the blind hole.

7. An assembly as claimed in claim 1, said enlargement within the hole being polygonal and having a straight horizontal edge that bears against the underside of the washer thereby to prevent relative rotation of the bolt and washer when the washer is jammed against the sides of the hole.

8. An anchorage assembly as claimed in claim 1, said washer in its jammed position having a lower end jammed against the sides of the hole and an upper end jammed against the sides of the hole, said washer aperture being eccentric to the washer and extending more closely adjacent said lower end of said washer than said upper end of said washer.

9. An anchorage assembly as claimed in claim 8, said lowermost bolt head or nut engaging said washer beneath the margins of said washer aperture that are most closely adjacent said lower end of said washer.

10. A method of securing a bolt in a cavity, comprising lowering the bolt, accompanied by a single washer element, into the cavity with an enlargement on the end of the bolt that is in the cavity, the washer element being free to tilt about the bolt and slide freely on its own accord down the cavity, then effecting an upward movement of the bolt to produce a force on the washer element eccentric to the center of gravity of the said washer element thereby causing it to tilt into a wedging and jamming position within the cavity without significant penetration of the side walls of the cavity thereby trapping the bolt but still allowing free play of the bolt at the neck of the cavity, and holding the bolt captive to the washer solely by said enlargement.

11. A method according to claim 10, and grouting the cavity after placement of the bolt.

* * * * *